Figure 1:
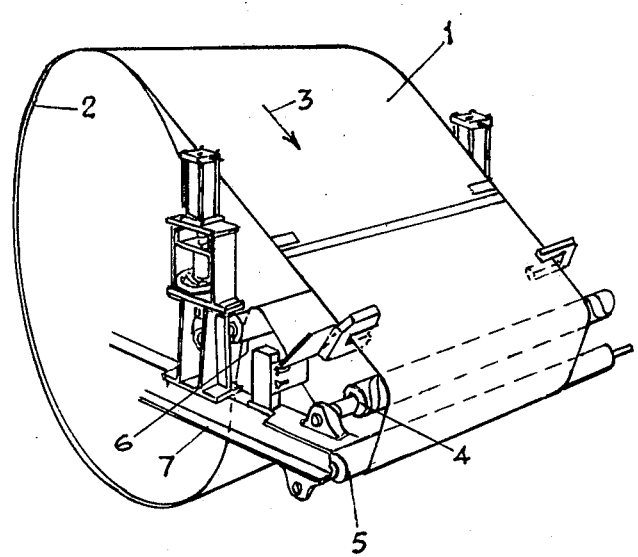

United States Patent [19]

Woodland

[11] 3,997,448
[45] Dec. 14, 1976

[54] FILTER ARRANGEMENTS
[75] Inventor: Eric Woodland, Langham, England
[73] Assignee: GEC Diesels Limited, Merseyside, England
[22] Filed: May 22, 1975
[21] Appl. No.: 579,858
[30] Foreign Application Priority Data
June 4, 1974 United Kingdom ............ 24671/74
[52] U.S. Cl. .............................. 210/400; 210/402; 210/DIG. 3
[51] Int. Cl.² ........................................ B01D 33/04
[58] Field of Search .......... 210/386, 391, 402, 404, 210/406, DIG. 3, 400

[56] References Cited
UNITED STATES PATENTS

| | | | |
|---|---|---|---|
| 2,592,581 | 4/1952 | Lorig | 210/DIG. 3 |
| 2,812,064 | 11/1957 | Siebenthal | 210/DIG. 3 |
| 3,075,647 | 1/1963 | Davis | 210/DIG. 3 |
| 3,116,244 | 12/1963 | Davis et al. | 210/402 |
| 3,144,409 | 8/1964 | Jauhola | 210/391 |
| 3,819,474 | 6/1974 | Holz | 210/DIG. 3 |

Primary Examiner—Charles N. Hart
Assistant Examiner—Robert H. Spitzer
Attorney, Agent, or Firm—Kirschstein, Kirschstein, Ottinger & Frank

[57] ABSTRACT

A tracking device for a travelling band filter. The band or belt tends to drift laterally as it travels along its path. This is corrected by fitting one of a number of rollers carrying the belt with opposite-handed helical formations to pull the belt in opposite directions. The helices work on tension bands in the edges of the belt there being a pair of helices, with a dead band between, for each tension band.

4 Claims, 2 Drawing Figures

U.S. Patent  Dec. 14, 1976  3,997,448

FILTER ARRANGEMENTS

This invention relates to travelling band filter arrangements and particularly to such arrangements comprising a drum and at least one other roller carrying a filter band in a continuous path. In one known arrangement the band is of woven material such as nylon and passes around the drum and several other rollers. The drum is mounted in a tank which is supplied with sludge or other material to be filtered and a vacuum is applied to the interior of the drum periphery so that the sludge adheres to the band as the drum rotates in it. As the cake of sludge material on the band is carried away from the drum it is scraped from the band at a small diameter discharge roll where the sudden reduction of path radius assists its removal.

This and various other arrangements using a travelling band or belt are well known. A problem that arises in such arrangements concerns the correct tracking of the filter band on the drum and rollers. Clearly, if the band drifts transversely as it travels around the drum and rollers, faulty operation will result. The vacuum chamber may be exposed to atmosphere and the band may be damaged by side obstructions.

One solution to this problem is to use a pair of short rollers on each edge of the band, the rolls of each pair being parallel to each other but inclined from the path of the band. One or other pair are then made to sandwich the belt in frictional engagement and thus bias the band to one side or the other. Such an arrangement is the subject of United Kingdom Pat. No. 1,309,731. However, such equipment is fairly complex and requires edge sensing means to first detect lateral drift of the band.

An object of the present invention is to provide simple and automatic means for correcting lateral drift of a travelling band.

According to the present invention, in a travelling band filter arrangement comprising a drum and at least one other roller carrying a filter band in a continuous path, a said roller is provided with a helical thread formation around its surface in separate portions of opposite hand, said portions being arranged to tend to drive the band transversely in opposite directions into a predetermined stable position on the roller.

The filter band may include a tension band arranged in frictional engagement with the drum and roller for driving purposes, said stable position of the filter band being that position in which the tension band runs between said separate portions of thread formation. The filter band preferably includes such a tension band at each edge, said roller then having two pairs of thread formations, the thread formations of each pair being of opposite hand and disposed about a respective edge location of the belt, so that each tension band is independently driven transversely into a stable position on the roller.

Alternatively, where there are only two portions of thread formation, they may be separated by a distance approximately equal to the width of the filter band the filter band being of substantial transverse rigidity such that it can be driven transversely by engagement of either edge alone with the associated portion of thread formation.

The thread formation may consist of a helical wire welded to the surface of the roller. The roller having thread formation thereon may be driven by the filter band, frictional mounting of the roller causing transverse movement of the filter band when in driving engagement with said thread formation.

Alternatively, the filter band may be arranged to be driven at least partly by the roller having the thread formation, frictional drag on the filter band throughout its path causing it to move transversely when in driving engagement with said thread formation.

Figure 2:
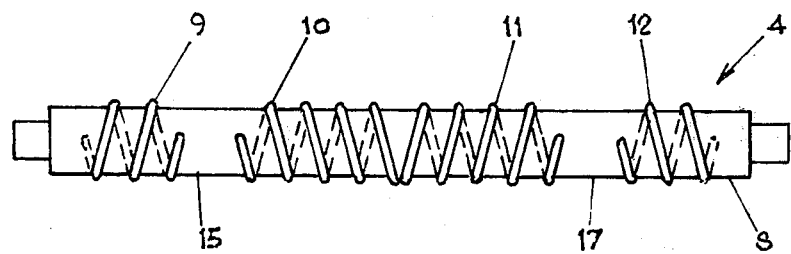

A filter arrangement in accordance with the invention will now be described, by way of example, with reference to the accompanying drawings, of which:

FIG. 1 is a perspective view of a filter drum, travelling band and associated rollers; and FIG. 2 is an elevation of a roller modified in accordance with the invention.

Referring to the drawings, the filter band 1 is fitted around a drum 2, shown in outline only, and passes from the drum in the direction of the arrow 3 to a discharge roller 4, an intermediate roller 5, a return roller 6, and back to the drum 2.

The drum has an open mesh curved surface within which are cells extending in succession around the periphery, each cell being connected by one or more pipes to a vacuum supply so that the periphery of the drum can be evacuated in sections according to the position in the filtering cycle. The rollers 4, 5 and 6 are mounted on a framework 7 on which also the drum shaft (not shown) is mounted. The drum is contained in a sludge tank (not shown) which extends upwardly beyond the drum shaft, the tank and the shaft being mounted on the same overall framework 7.

There may be means provided for detecting longitudinal slip of one edge of the band 1 relative to the other and for correcting it by tilting one of the rollers. Such means are shown in FIG. 1 and described in the above patent specification but are not relevant to the present invention.

The present invention may be applied to several of the rollers and even to the drum itself but it will be described as being applied solely to the discharge roller 4 shown, diagramatically, in FIG. 2, as it would appear from the right foreground of FIG. 1.

The filter band 1 is, in this example, made of woven nylon and is soft and pliable over most of its width. At each edge, however, it is strongly reinforced by various layers of belt material to provide a tension band which has negligible extensibility. The rollers are adjusted so that in operation these tension bands are taut, very little strain being imposed on the main area of the filter band 1. The band 1 is driven primarily from the drum but also, through gearing not shown, from the discharge roller 4 which is arranged to have a surface velocity very slightly greater than that of the band 1 itself.

The discharge roller 4, shown in FIG. 2, is formed with two pairs of helical thread portions formed on its surface. These thread portions are formed of steel rod wound to the required form and welded to the tubular shaft 8. A thread of about 1 1/4 inch pitch on a shaft of 1½ inches diameter is found suitable, although it will be clear that a substantial variation from these figures is possible.

One pair of threaded portions consists of an outer portion 9 of left-hand form and an inner portion 10 of right-hand form. These two portions are separated by an unthreaded section 15 of width slightly greater than the width of the tension band on the edge of the filter band 1. The other pair of threaded portions consists of the mirror image of the first pair, having an outer right-hand portion 12 and an inner left-hand portion 11. The width of the band 1 is then such that the tension bands lie comfortably in the sections 15 and 17 in correct normal operation.

The roller 4 is arranged to drive the band 1 to a small extent with the result that if either tension band drifts out of its section 15 or 17 into engagement with a threaded portion it will gradually be driven back into its normal stable position.

It will be clear that many variations of the above construction are possible. If the band 1 is made in such a way as to have some transverse rigidity, it would be sufficient to use only the outer threaded portions 9 and 12 so that the band was always pushed back into position rather than pulled and pushed.

Again, it might in some circumstances be desirable to use a single tension band running centrally in the filter band 1. There could again be only the two outer portions 9 and 12 but in this case separated only by the tension band width.

In the above case, the discharge roller 4 drives the band 1. If the roller 4 were loaded in some way or suitably geared to the drum, it could be made to have a surface velocity smaller than the band velocity. The same corrective effect would then be achieved by reversing the hand of all of the thread portions.

Clearly, the invention is not restricted to vacuum drum filters but is applicable to any filter having such a travelling band arrangement.

I claim:

1. A travelling band filter arrangement comprising a plurality of rollers including a drum roller and at least one other roller, and a continuous filter band carried by said rollers, said filter band including two tension bands, one of said rollers having four portions of helical thread formation around its surface, said portions comprising two pairs, the portions of each pair being separated by a respective smooth portion of roller surface which is engaged by a respective one of said tension bands when said filter band is running centrally on said one of said rollers, said portions of each pair being of opposite hand which, in relation to the direction of rotation is such as to impose a transverse bias on the respective tension band tending to return it to its respective smooth portion of roller surface in the event of its drifting in either direction therefrom.

2. A filter arrangement according to claim 1, wherein said thread formation consists of a helical wire welded to the surface of the roller.

3. A filter arrangement according to claim 1, wherein said one roller is driven by the filter band, frictional mounting of said one roller causing transverse movement of the filter band when in driving engagement with said thread formation.

4. A filter arrangement according to claim 1, wherein said filter band is driven at least partly by said one roller, frictional drag on the filter band throughout its path causing it to move transversely when in driving engagement with said thread formation.

* * * * *